UNITED STATES PATENT OFFICE.

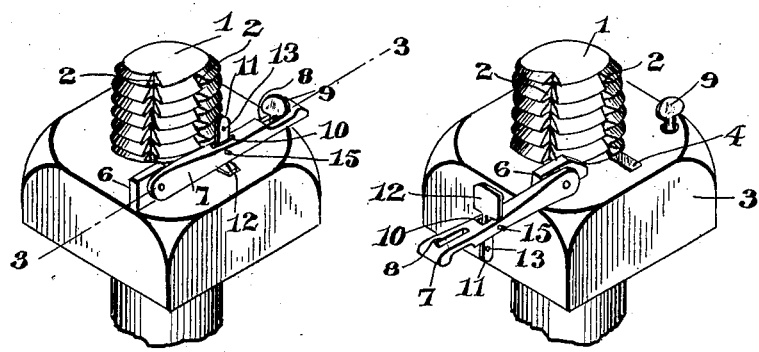
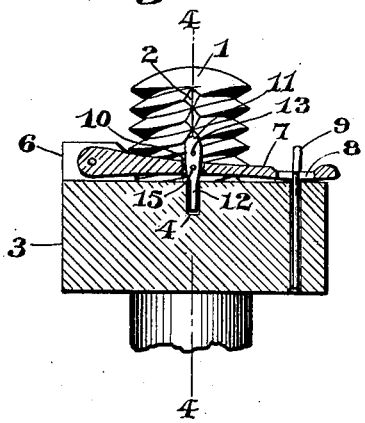
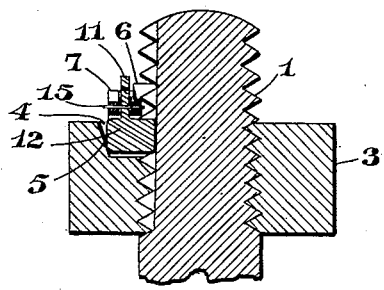

ROBERT JACKSON LOCKER, OF MATSON, MISSOURI.

LOCK-NUT.

1,101,298.  Specification of Letters Patent.  Patented June 23, 1914.

Application filed July 18, 1913. Serial No. 779,810.

*To all whom it may concern:*

Be it known that I, ROBERT J. LOCKER, a citizen of the United States, residing at Matson, in the county of St. Charles and State of Missouri, have invented new and useful Improvements in Lock-Nuts, of which the following is a specification.

The present invention relates to improvements in means for locking a nut upon a bolt, and resides in the construction, combination and arrangement of parts set forth in the following specification and falling within the scope of the appended claim.

In the drawing: Figure 1 is a perspective view of a nut and bolt secured against separation in accordance with the present invention, Fig. 2 is a perspective view showing the locking device carried by the nut swung away from engagement with the bolt, Fig. 3 is a transverse sectional view taken approximately on the line 3—3 of Fig. 1, Fig. 4 is a sectional view on the line 4—4 of Fig. 3.

Referring now to the drawings in detail, 1 designates a bolt which has its threaded shank provided with a plurality of longitudinally extending grooves 2.

The nut is designated by the numeral 3, and may be of any ordinary or desired formation, the said nut having its outer face provided with a depression 4, the said depression entering the bore of the nut and adapted to communicate with one of the grooves of the bolt 1. The side, or what may be termed the outer wall of the depression 4 is preferably inclined or beveled, as indicated by the numeral 5. Secured upon the outer face of the nut or integrally formed therewith, to one side of the depression 4 is a lug 6, the same having pivotally connected thereto an arm 7. The free end of the pivoted arm 7 is formed with a longitudinally extending rectangular opening 8 which is adapted to receive the rectangular head of a thumb latch member 9. The latch has its stem arranged for rotation within the nut, and is secured therein in any desired or preferred manner. The stem projects a suitable distance above the face of the nut, so that the head of said latch may be rotated, after the same passes through the opening 8 of the arm 7 to secure the arm in locked position upon the nut. The arm 7 is approximately centrally provided with a second opening 10 through which is adapted to extend the reduced shank 11 of a locking member or detent 12. It may here be stated that the stem 11 is provided with a plurality of transverse openings 13, any of which being adapted to receive a pintle 15 which is arranged transversely of the arm 7 and which passes through any of the said orifices 13. It may here be stated that the arm 7 is loosely pivotally connected with the lug 6, so that the same is afforded a limited amount of lateral movement, and that the locking detent 12 is adapted to be inserted within the depression 4 and to engage with one of the grooves 2 of the bolt, when the said bolt is brought to register with the depression. The outer edge of the detent engaging with the inclined wall 5 of the depression 4 causes the said detent to be forced into tight engagement with the walls of one of the grooves 2 of the bolt, and the stem of the latch is of such a size as to permit of said movement of the arm, incident to the inward movement of the detent.

From the above description, taken in connection with the accompanying drawings, the simplicity of the device, as well as the advantages thereof will, it is thought, be perfectly apparent to those skilled in the art to which such inventions appertain without further detailed description.

Having thus described the invention, what I claim is:

The combination with a bolt having a shank provided with grooves, a nut for the bolt having its outer face formed with a depression which is adapted to register with one of the grooves in the bolt, an arm pivoted to the said outer face of the nut adjacent one of the corners thereof and adapted to be swung over the depression in the nut, the said arm having an elongated opening, a detent including a flat member having a stem provided with spaced openings passing through the slot in the arm, the said arm having an orifice which communicates with the slot therein, a pin passing through the orifice and engaging with one of the openings in the shank of the detent, and the said detent when the arm is swung, being adapted to be arranged within the depression in the nut and to engage within one of the grooves in the bolt, and means for locking the arm upon the nut.

In testimony whereof I affix my signature in presence of two witnesses.

ROBERT JACKSON LOCKER.

Witnesses:
R. E. L. FULKERSON,
R. E. CHESLEY.